United States Patent [19]

Skala

[11] 4,322,270
[45] Mar. 30, 1982

[54] PROCESS FOR DEPLETING AN IMPURITY BY ELECTROLYSIS AND RECOVERING ELECTRICAL ENERGY FROM ITS DECOMPOSITION PRODUCTS

[76] Inventor: Stephen F. Skala, 3839 S. Wenonah Ave., Berwyn, Ill. 60402

[21] Appl. No.: 224,655

[22] Filed: Jan. 12, 1981

Related U.S. Application Data

[63] Continuation-in-part of Ser. No. 117,240, Jan. 31, 1980, Pat. No. 4,276,145.

[51] Int. Cl.$^3$ ............................................... C25C 3/02
[52] U.S. Cl. ........................................... 204/68; 204/4
[58] Field of Search ........................... 204/68, DIG. 4

[56] References Cited

U.S. PATENT DOCUMENTS

| | | | |
|---|---|---|---|
| 1,191,799 | 7/1916 | Labhardt | 204/68 |
| 1,524,268 | 1/1925 | McNitt | 204/68 |
| 2,414,831 | 1/1947 | McNitt | 204/68 |
| 3,975,913 | 8/1976 | Erickson | 204/DIG. 4 |

*Primary Examiner*—Howard S. Williams
*Attorney, Agent, or Firm*—Stephen F. Skala

[57] ABSTRACT

An electrolyzable impurity, having a lower decomposition voltage than the electrolyte in which it is formed and dissolved, is depleted by operating an electrolysis cell between the decomposition voltages of the impurity and electrolyte. Such electrolytic decomposition of the impurity at a lower voltage does not decompose the electrolyte and enables a high degree of depletion with efficient use of electrical energy. In a preferred system, the impurity is depleted in an electrolysis cell separate from the apparatus in which it is formed and decomposition products of the impurity are recombined in a fuel cell for energy recovery.

This process of depleting an impurity is applied to production of sodium metal by electrolysis of molten sodium hydroxide wherein water forms as a decomposition product to function as an impurity which diminishes sodium yield in a secondary reaction. The sodium hydroxide electrolyte with its dissolved water impurity is withdrawn from a first electrolysis cell operating above the decomposition voltage of the sodium hydroxide, flows through a second electrolysis cell operating between the decomposition voltages of the sodium hydroxide and water whereby the water is decomposed into hydrogen and oxygen which are transported to a fuel cell, and is returned as depleted electrolyte to the first electrolysis cell for further electrolysis at an improved current efficiency.

12 Claims, 3 Drawing Figures

PROCESS FOR DEPLETING AN IMPURITY BY ELECTROLYSIS AND RECOVERING ELECTRICAL ENERGY FROM ITS DECOMPOSITION PRODUCTS

This application is a continuation-in-part of application Ser. No. 117,240 filed Jan. 31, 1980 and now U.S. Pat. No. 4,276,145.

CROSS-REFERENCES TO RELATED APPLICATIONS

Ser. No. 221,552 entitled: Electrolyte Circulation Through an Electrode.

BACKGROUND

This invention relates to electrolysis and particularly to depletion of impurities formed and dissolved in electrolyte.

If an electrolyte contains an electrolyzable impurity which has a lower decomposition voltage than the electrolyte, the impurity can be preferentially decomposed by electrolysis. As one example, sodium carbonate dissolved in molten sodium chloride can be decomposed without evolving chlorine gas. As another example, water dissolved in molten sodium hydroxide can be decomposed by electrolysis without decomposing the sodium hydroxide. Water is a decomposition product of molten alkali hydroxide electrolysis and is an impurity since it diminishes yield of alkali metal and current efficiency of an electrolysis cell.

The primary decomposition of molten sodium hydroxide is $$2NaOH \rightarrow 2Na + H_2O + \tfrac{1}{2}O_2$$

with sodium metal forming on the cathode and dissolving in adjacent catholyte, with water forming on the anode and dissolving in adjacent anolyte, and with oxygen also forming on the anode but in a gaseous phase which separates from the anolyte. The dissolved decomposition products can diffuse into opposite portions of the electrolyte to result in the secondary reaction $$Na + H_2O \rightarrow NaOH + \tfrac{1}{2}O_2$$

so that the two moles of sodium metal produced according to the primary decomposition are diminished to one mole thereby limiting current efficiency of conventional cells to 50% for the mole mobile of the alkali metal ions. But even if an ideal diaphragm or other means existed for preventing such diffusion, the formed water would consume current for the decomposition $$H_2O \rightarrow H_2 + \tfrac{1}{2}O_2.$$

Since that current flows at the higher voltage needed for the decomposition of sodium hydroxide, an irrecoverable loss of energy corresponds to the difference of decomposition voltage between the sodium hydroxide and the water.

OBJECTS OF THE INVENTION

It is a general object to provide a process for depleting an electrolyzable impurity which is forming and dissolving in an electrolyte.

It is another object to deplete such impurity from electrolysis cells when the impurity diminishes yield thereby improving current efficiency of the electrolysis cell.

It is yet another object to recover energy from the products of decomposition of the impurity thereby further improving energy efficiency of an electrolysis system.

It is a more particular object to decompose water forming as an impurity in molten alkali hydroxide to diminish a secondary reaction of the water with alkali metal.

SUMMARY

These and other objects and advantages which will become apparent are attained by the invention wherein an electrolyzable impurity in a substance is depleted by electrolysis and decomposition products of the impurity react in a fuel cell to generate electrical energy. When the substance is an electrolyte which forms the impurity as a decomposition product and the electrolyte has a higher decomposition voltage than the impurity, the invention includes the following advantages. In an electrolysis cell operating between the high and low decomposition voltages, the electrolyte is not decomposed and current is proportional to impurity ion concentration so that as the impurity is substantially depleted, current becomes negligible. Accordingly, a high degree of depletion is attained at a high current efficiency. Further, a portion of the energy expended for electrolyzing the impurity can be recovered by the reforming impurity decomposition products in the fuel cell. The formation and depletion of the impurity may be an alternating or, preferably, a continuous process wherein the electrolyte flows in a path which includes an apparatus in which the impurity forms in the electrolyte and an electrolysis cell in which the impurity is depleted for return to the apparatus.

In the preferred embodiment of the invention, molten sodium hydroxide is electrolyzed to form sodium metal as a product and water as an impurity in an anolyte portion of an electrolysis cell. The anolyte with its dissolved water impurity is transported to an electrolytic dehydrator which is an electrolysis cell operating between the low decomposition voltage of the water and the high decomposition voltage of the sodium hydroxide. The water is decomposed into hydrogen and oxygen which separate from the sodium hydroxide as a gaseous phase, the sodium hydroxide is returned to the electrolysis cell, and the hydrogen and oxygen are transported to a fuel cell. With water depleted from the anolyte, the electrolysis cell operates at an improved current efficiency and a portion of the energy expended for the depletion is recovered by the fuel cell.

DESCRIPTION OF THE PREFERRED EMBODIMENTS

Figure 1:
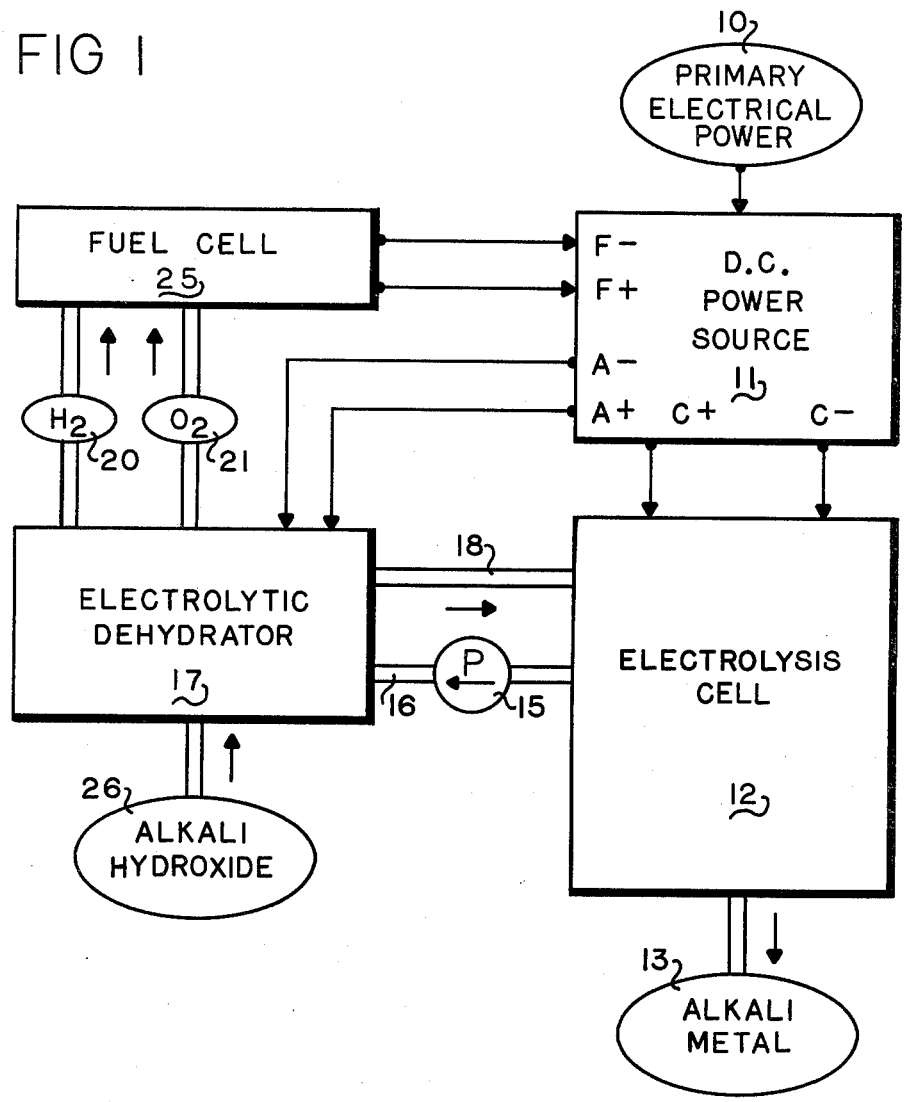
FIG. 1 is a diagrammatic drawing of a system comprising a first electrolysis cell which is an electrolyte electrolysis cell and forms an impurity, a second or impurity electrolysis cell which is shown as an electrolytic dehydrator to deplete the impurity according to the invention, and a fuel cell to recover energy from decomposition products of the impurity.

FIG. 1 shows the system of the invention applied to electrolysis of molten alkali hydroxide electrolyte. Water dissolved as an impurity in the electrolyte is depleted by electrolysis in an electrolytic dehydrator. The hydrogen and oxygen decomposition products of the water release electrical energy in a fuel cell.

Primary electrical power 10 from utility lines is transformed to an appropriate lower voltage and rectified to a direct current by D.C. power source 11. The D.C. power source includes terminals C+ and C− which connect to a first electrolysis cell 12, such as a Castner cell, for production of alkali metal 13 from molten alkali hydroxide.

As the electrolysis cell 12 operates, water forms, dissolves in electrolyte, and circulates in a fluid circuit which includes pump 15 in supply conduit 16, an electrolytic dehydrator 17, and a return conduit 18. The electrolytic dehydrator is a second electrolysis cell which receives electrical power from terminals A+ and A− of the D.C. power source at a voltage sufficient to decompose water but not sufficient to decompose alkali hydroxide. The lower decomposition voltage of water enables its electrolysis in the electrolytic dehydrator with less energy than otherwise would be expended in the electrolysis cell to decompose the same amount of water. Hydrogen 20 and oxygen 21, formed as decomposition products of the water, are transported to fuel cell 25 to generate electrical energy which is received by the D.C. power source at terminals F+ and F−. This electrical energy is transformed by known inverter and rectifier means to appropriate voltages for use by the electrolysis cell and the electrolytic dehydrator. Alkali hydroxide 26 to replace decomposed electrolyte is supplied through the electrolytic dehydrator.

Hydroxides of the alkali metals and their mixtures have been reduced to the corresponding metals by electrolysis. Mixtures of both the hydroxides and the alkali metals have lower melting temperatures than the pure substances. Dissolved sodium has a greater mobility than potassium so that potassium diffusion is smaller, a smaller proportion reacts with water in the secondary reaction, and the current efficiency of potassium hydroxide electrolysis is substantially higher than that of sodium hydroxide.

Figure 2:
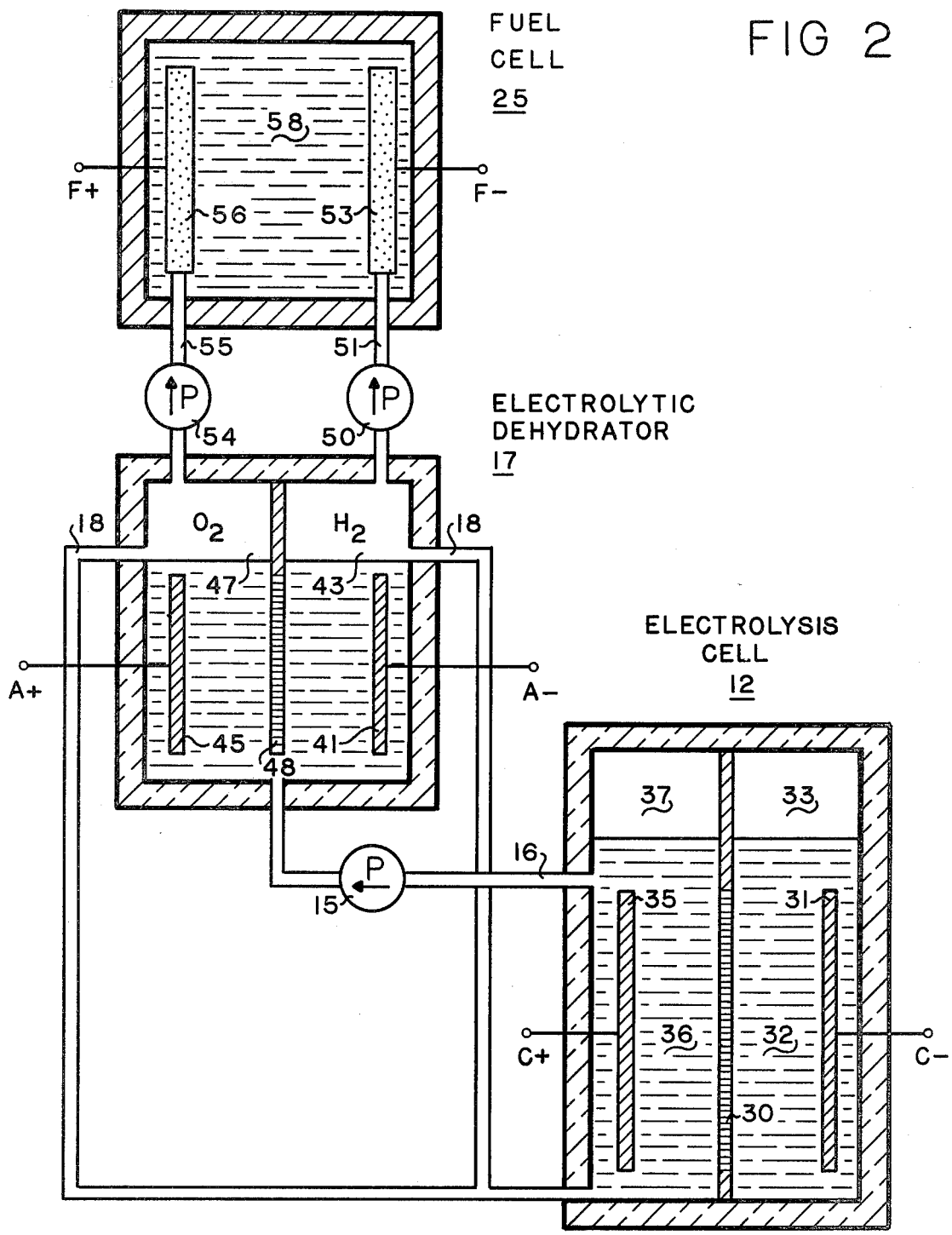
FIG. 2 is a schematic drawing showing electrochemical portions of the system in more detail.

FIG. 2 shows an electrolysis cell for molten alkali hydroxide, an electrolytic dehydrator for depleting water impurity, and a fuel cell. These electrochemical components have the following voltage characteristics:

| COMPONENT | REACTION | REVERSIBLE VOLTAGE | TEMPERATURE |
|---|---|---|---|
| electrolysis cell | $2NaOH \rightarrow 2Na + H_2O + \frac{1}{2}O_2$ | 2.32 | 325° C. |
| dehydrator | $H_2O \rightarrow H_2 + \frac{1}{2}O_2$ | 1.07 | 325° C. |
| fuel cell | $H_2 + \frac{1}{2}O_2 \rightarrow H_2O$ | 1.23 | 50° C. |

The reversible voltages show that an adequate margin exists between the decomposition voltages of sodium hydroxide and water to enable electrolysis of the water but not of the sodium hydroxide. More generally, an electrolyzable impurity having a substantially lower decomposition voltage than its solute electrolyte can be similarly depleted by electrolysis. At such lower decomposition voltages, the electrolyzing current flows only to decompose the impurity and stops when the impurity is completely depleted. Accordingly, electrolytic depletion is an energy efficient and highly effective process when the respective decomposition voltages are enabling.

Electrolysis cell 12 for decomposing molten sodium hydroxide is separated by a nickel gauze diaphragm 30 into a catholyte portion and an anolyte portion. The catholyte portion comprises cathode 31, catholyte 32, and a chamber 33. As the cell operates, sodium metal forms on the cathode and dissolves in the catholyte. When the catholyte becomes saturated with sodium, phase separation occurs and the sodium rises to chamber 33 from which it is removed by screening. The anolyte portion comprises anode 35, anolyte 36, and a chamber 37 from which oxygen forming on the anode is collected. Water forming on the anode dissolves in the anolyte. The electrolysis cell 12 may be of the type disclosed by H. Y. Castner in U.S. Pat. No. 452,030 (1891). Typical voltages across terminals C+ and C− range from about 3.5 to 4.5 volts where the difference between the reversible and the operating voltage corresponds to ohmic loss across the electrolyte.

Electrolytic dehydrator 17 is a second electrolysis cell which decomposes water as an impurity in molten sodium hydroxide electrolyte at a voltage between the decomposition voltages of the sodium hydroxide and the water. As the electrolytic dehydrator operates, hydrogen gas forms on cathode 41 and rises into chamber 43. Oxygen forms on anode 45 and rises into chamber 47. Diaphragm 48 is a porous nickel sheet which prevents the evolved hydrogen and oxygen gases from mixing. Anolyte 36 with its dissolved water is transported from the electrolysis cell by pump 15 through supply conduit 16, through the electrolytic dehydrator for depletion of the water, and through return conduit 18 back into the electrolysis cell for further decomposition. Current efficiency of the decomposition of water in the electrolytic dehydrator is high since the hydrogen and oxygen gases separate from the electrolyte to preclude the secondary reactions which would reduce yield of the gases. Voltage efficiency can be high when interelectrode distance is reduced to diminish resistive loss of energy in the electrolyte. In an electrolysis cell disclosed by R. G. Cottam et al. in U.S. Pat. No. 3,242,059, porous electrodes adjacent to a diaphragm enable electrolyte to percolate therethrough and gases to escape through the electrodes with the distance between the electrodes reduced to the thickness of the diaphragm.

Fuel cell 25 is a conventional type which recovers energy from the hydrogen and oxygen decomposition products of the depleted water. A pump 50 and conduit 51 deliver hydrogen under pressure from chamber 43 to cathode 53. Similarly, pump 54 and conduit 55 deliver oxygen from chamber 47 to anode 56. The anode 56 and cathode 53 are porous nickel which distributes the gases to the surface and functions as a catalyst for ionization of the gases. The ions are conducted through an aqueous potassium hydroxide electrolyte 58. Electrical outputs F+ and F− connect to the power source shown in FIG. 1 for use by the electrolytic dehydrator and electrolysis cell.

Alternatively, the electrolysis cell 12 can be used both for decomposing the electrolyte at the higher decomposition voltage and for depleting the impurity at the lower decomposition voltage by alternating the voltages. Pump 15 is disabled to prevent flow of the electrolyte to the electrolytic dehydrator and conduits, not shown, connect chamber 37 to pump 54 and chamber 33 to pump 50. The voltage between terminals C+ and C− is at the higher decomposition voltage for one predetermined period and at the lower decomposition voltage for another predetermined period. The predetermined periods are such that the water does not have sufficient time to diffuse from the anode into the catholyte during the higher voltage period and that the hydrogen and hydroxyl ions have sufficient time to be attracted to their respective electrodes during the lower voltage period. This alternative process is particularly effective when the electrolyzable impurity is the dominant source of undesirable effects. For electrolysis of molten alkali hydroxide, effects of water in the secondary reaction with alkali metal and electrolysis of the water become more dominant as diffusion of the alkali metal is diminished. Such diminished diffusion occurs where the alkali metal is of lower mobility as for potassium or where the alkali metal is depleted from the catholyte. But even under such conditions, operation of a single cell at alternating voltages has disadvantages over the preferred embodiment of two electrolysis cells including diminished production time and some electrolysis of water at the higher voltage with reduced efficiency.

In yet another embodiment, the electrolytic dehydrator is used to complete dehydration of alkali hydroxide which may be formed in a chlor-alkali cell. After an initial evaporation of water, molten alkali hydroxide is stored in a vessel, not shown. The electrolysis cell 12 is disconnected and conduit 16 is connected to the vessel. The alkali hydroxide with its water impurity flows into conduit 16, through the electrolytic dehydrator 17, and through conduit 18 into another vessel, not shown, for receiving dehydrated alkali hydroxide. The fuel cell 25 receives hydrogen and oxygen decomposition products from the electrolytic dehydrator for energy recovery. This process of electrolytic impurity depletion is based on a flow of ions of the impurity through a substance toward an electrode having an opposite charge. The process is limited to impurities which ionize in and flow through the substance and to substances which are not decomposed by the process of depleting the impurity. In particular, if the substance is an electrolyte its decomposition voltage must be higher than the decomposition voltage of the impurity.

Figure 3:
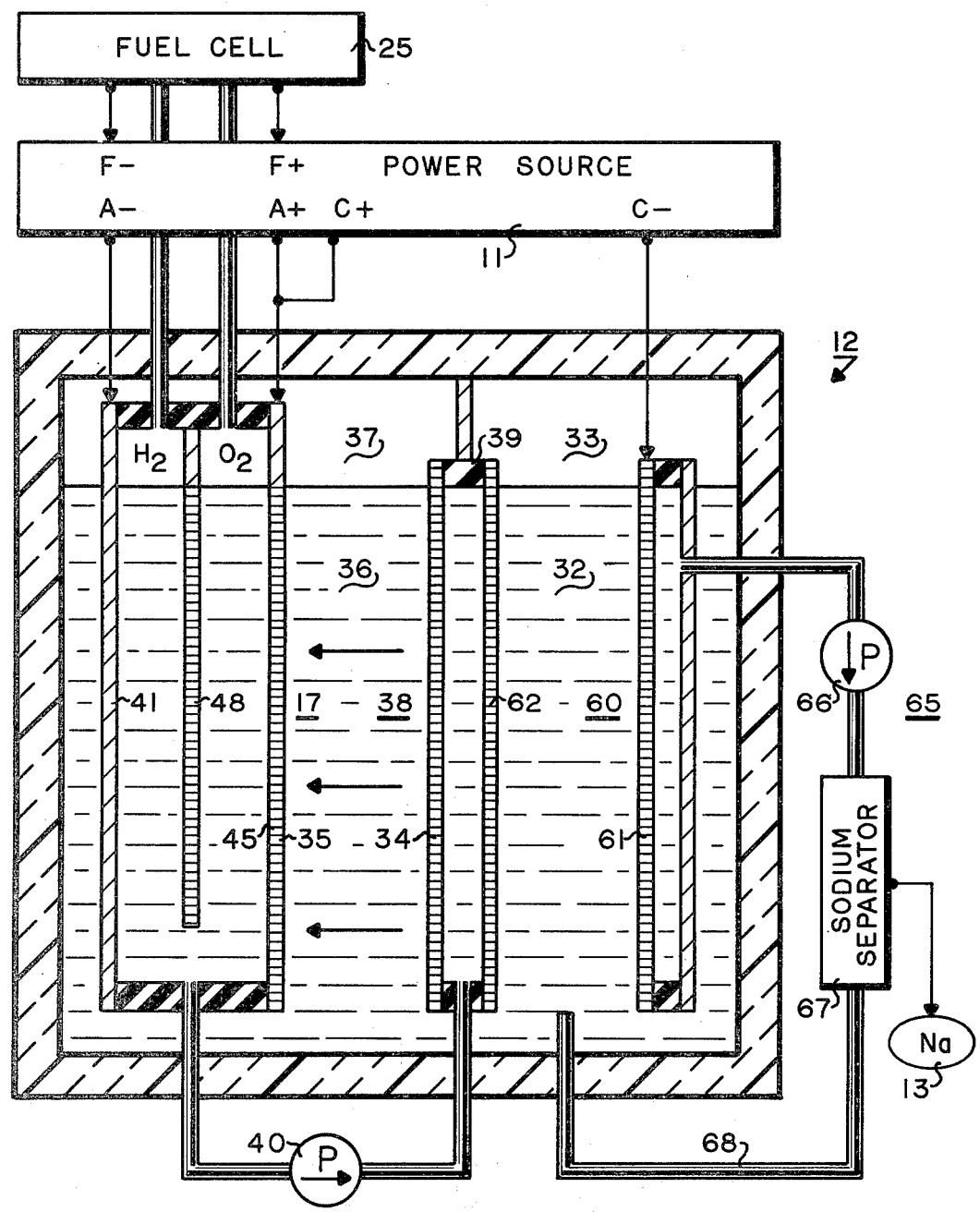
FIG. 3 is a schematic drawing of the first electrolysis cell as an embodiment having porous electrodes through which electrolyte and dissolved impurity are withdrawn into the second electrolysis cell which depletes the impurity.

In FIG. 3, impurity forming on a porous electrode is drawn through the electrode as it dissolves in the electrolyte thereby reducing residence time of the impurity in the electrolysis cell.

Electrolysis cell 12 comprises an electrolytic dehydrator 17, a cathode assembly 60, and a diaphragm assembly 38. A power source 11 provides electrical power for electrolysis and receives electrical power from hydrogen-oxygen fuel cell 25. A sodium separation loop 65 reduces sodium metal content of electrolyte flowing therethrough. The diaphragm assembly 38 divides the electrolysis cell into an anolyte 36 portion and a catholyte 32 portion. In the anolyte portion, anode 35 has openings which may be perforations in a foil, interstices in a wire gauze or screen, or intergranular spaces in a sintered plate. The anode is fabricated from an electrical conductor which is compatible with sodium hydroxide such as nickel.

As the electrolysis cell operates, oxygen and water form on anode 35. A portion of the oxygen may rise into chamber 37 from which it is released through a vent, not shown. The remaining oxygen and substantially all of the water are incorporated into the anolyte and are drawn through the openings in the anode into the electrolytic dehydrator 17 which is an electrolysis cell operating at a voltage sufficient to decompose the dissolved water but not sufficient to decompose the sodium hydroxide. The anode 35 and 45, which connects to terminals A+ and C+, is common to the electrolysis cell 12 and the electrolytic dehydrator 17. The anode 45 and cathode 41 are separated by a diaphragm 48 functioning to prevent oxygen which forms on the anode from mixing with hydrogen which forms on the cathode. The hydrogen and oxygen are transported to fuel cell 25 and react on electrodes therein, not shown, to generate electrical energy which is transmitted to terminals F+ and F− of power source 11 for use in electrolysis. After the anolyte has passed through the electrolytic dehydrator, it is returned to the electrolysis cell by pump 40 through the diaphragm assembly 38. The diaphragm assembly comprises anolyte diaphragm 34 and catholyte diaphragm 62 spaced apart by separators 39. The diaphragm has a porous structure and may be any material compatible with sodium hydroxide. The diaphragm used in Castner cells, for example, is a nickel gauze.

As the electrolysis cell operates, sodium metal forming on cathode 61 dissolves in adjacent catholyte which is drawn through openings in the cathode. The cathode 61 is similar in structure and function to the anode 35. The catholyte is forced by pump 66 into sodium separator 67. The sodium separator is based on known methods for separating sodium metal from its hydroxide which include heating to reduce solubility of the metal in the hydroxide, distilling to vaporize the metal which has a lower boiling temperature, and scrubbing with mercury, lead, or other liquid compatible with alkali hydroxide and having substantially greater solubility for the metal than for its hydroxide. The catholyte, depleted of its sodium metal impurity, is returned to the catholyte portion of the electrolysis cell through conduit 68 and sodium metal is transported to collector 13.

Alternative embodiments of porous electrodes are disclosed in the cross-referenced application wherein the anode diaphragm is adjacent to the porous anode, the cathode diaphragm is adjacent to the porous cathode, and the electrolyte is returned between the diaphragms. In this structure, interelectrode distance is reduced to provide improved voltage efficiency.

Sodium is a representative alkali metal and hydroxides of other alkali metals and their mixtures can be processed to deplete water electrolytically according to the invention. Further, the process of the invention comprising depletion of impurity by electrolysis can be extended to other electrolyzable impurities having a substantially lower decomposition voltage than the electrolyte in which they are dissolved. Accordingly, various modifications of the specific embodiments described herein may be made without departing from the spirit and of the invention and it is intended that all such modifications be interpreted as contemplated by the invention.

I claim:

1. A process for depleting an electrolyzable impurity from a substance, comprising the steps of:

forming the impurity in the substance, said impurity forming ions which flow through the substance in an electrostatic field, said substance not being decomposed at the decomposition voltage of the impurity, and transporting the substance to an impurity electrolysis cell, operating the impurity electrolysis cell which contains the substance with the impurity therein at a voltage which decomposes the impurity but does not decompose the substance thereby depleting the impurity, and transporting at least one of the decomposition products formed by operating the impurity electrolysis cell to a fuel cell for generation of electrical energy.

2. The process of claim 1 comprising the additional step of forming the impurity in the depleted substance and returning to the step of operating the impurity electrolysis cell whereby the impurity is repeatedly formed in and depleted from the substance.

3. The process of claim 2 wherein the steps of forming the impurity in the substance and depleting the impurity are discrete alternating steps.

4. The process of claim 2 wherein the impurity is formed in the substance at a first location and comprising the additional steps of:

transporting the substance with impurity therein from the first location to the impurity electrolysis cell which is at a second location, and returning depleted substance from the impurity electrolysis cell to the first location where the impurity forms in the depleted substance.

5. The process of claim 4 wherein the impurity is formed at the first location, previously formed impurity is depleted at the second location at the same time, and the substance circulates continuously in a path which includes the first and second locations.

6. The process of claims 1, 2, 3, 4, or 5 wherein the decomposition products transported to the fuel cell include hydrogen.

7. A process for depleting an electrolyzable impurity from an electrolyte, said electrolyte having a higher decomposition voltage than the impurity and forming the impurity as a decomposition product, comprising the steps of:

forming the impurity in the electrolyte by operating an electrolysis cell to decompose the electrolyte, operating an impurity electrolysis cell which contains the electrolyte with impurity therein at a lower voltage which decomposes the impurity but does not decompose the electrolyte thereby depleting the impurity, and transporting at least one of the decomposition products formed by operating the impurity electrolysis cell to a fuel cell for generation of electrical energy.

8. The process of claim 7 comprising the additional step of forming the impurity in the depleted electrolyte and returning to the step of operating the impurity electrolysis cell whereby the impurity is repeatedly formed in and depleted from the electrolyte.

9. The process of claim 8 wherein the steps of forming the impurity in the electrolyte and depleting the impurity are discrete alternating steps.

10. The process of claim 8 wherein the impurity is formed in the electrolyte in the electrolysis cell at a first location and comprising the additional steps of:

transporting the electrolyte with impurity therein from the first location to the impurity electrolysis cell which is at a second location, and returning depleted electrolyte from the impurity electrolysis cell to the first location where the impurity forms in the depleted electrolyte.

11. The process of claim 10 wherein the impurity is formed at the first location, previously formed impurity is depleted at the second location at the same time, and the electrolyte circulates continuously in a path which includes the first and the second locations.

12. The process of claims 7, 8, 9, 10, or 11 wherein the electrolyte is a molten alkali hydroxide and the decomposition product from the impurity electrolysis cell which is transported to the fuel cell is hydrogen.

* * * * *